United States Patent [19]

Hamada et al.

[11] Patent Number: 4,505,021
[45] Date of Patent: Mar. 19, 1985

[54] METHOD FOR MANUFACTURING AN ELECTROCHROMIC DISPLAY DEVICE

[75] Inventors: Hiroshi Hamada, Nara; Hiroshi Take, Ikoma; Kozo Yano, Yamatokoriyama; Yasuhiko Inami, Nara, all of Japan

[73] Assignee: Sharp Kabushiki Kaisha, Osaka, Japan

[21] Appl. No.: 434,502

[22] Filed: Oct. 15, 1982

[30] Foreign Application Priority Data

Oct. 22, 1981 [JP] Japan ................................ 56-169614
Dec. 29, 1981 [JP] Japan ................................ 56-210291

[51] Int. Cl.$^3$ .............................................. G02F 1/17
[52] U.S. Cl. .................................... 29/570; 29/569 L; 350/357
[58] Field of Search ................ 29/570, 569 L; 350/357

[56] References Cited

U.S. PATENT DOCUMENTS 4,127,853 11/1978 Leibowitz ...................... 350/357 X

FOREIGN PATENT DOCUMENTS 0010747 1/1977 Japan ................................. 350/357
2067330 6/1981 United Kingdom ............... 350/357
2088577 6/1982 United Kingdom ............... 350/357

Primary Examiner—Brian E. Hearn
Assistant Examiner—Alan E. Schiavelli
Attorney, Agent, or Firm—Birch, Stewart, Kolasch & Birch

[57] ABSTRACT

A method for preparing an electrochromic display device comprising first and second electrochromic layers and a solid electrolyte interposed therebetween, comprises the steps of forming a conductive film on a substrate, forming an insulating film, over the entire surface of the conductive film forming a resist at portions on the insulating film other than a display pattern and lead-in electrodes, removing the insulating film at the display pattern and the lead-in electrodes, forming the electrochromic material layers and the solid electrolyte over the entire portions other than the lead-in electrode, removing the resist and the electrochromic layers and the solid electrolyte as formed on the insulating film, and forming a second electrode on the second electrochromic layer.

12 Claims, 7 Drawing Figures

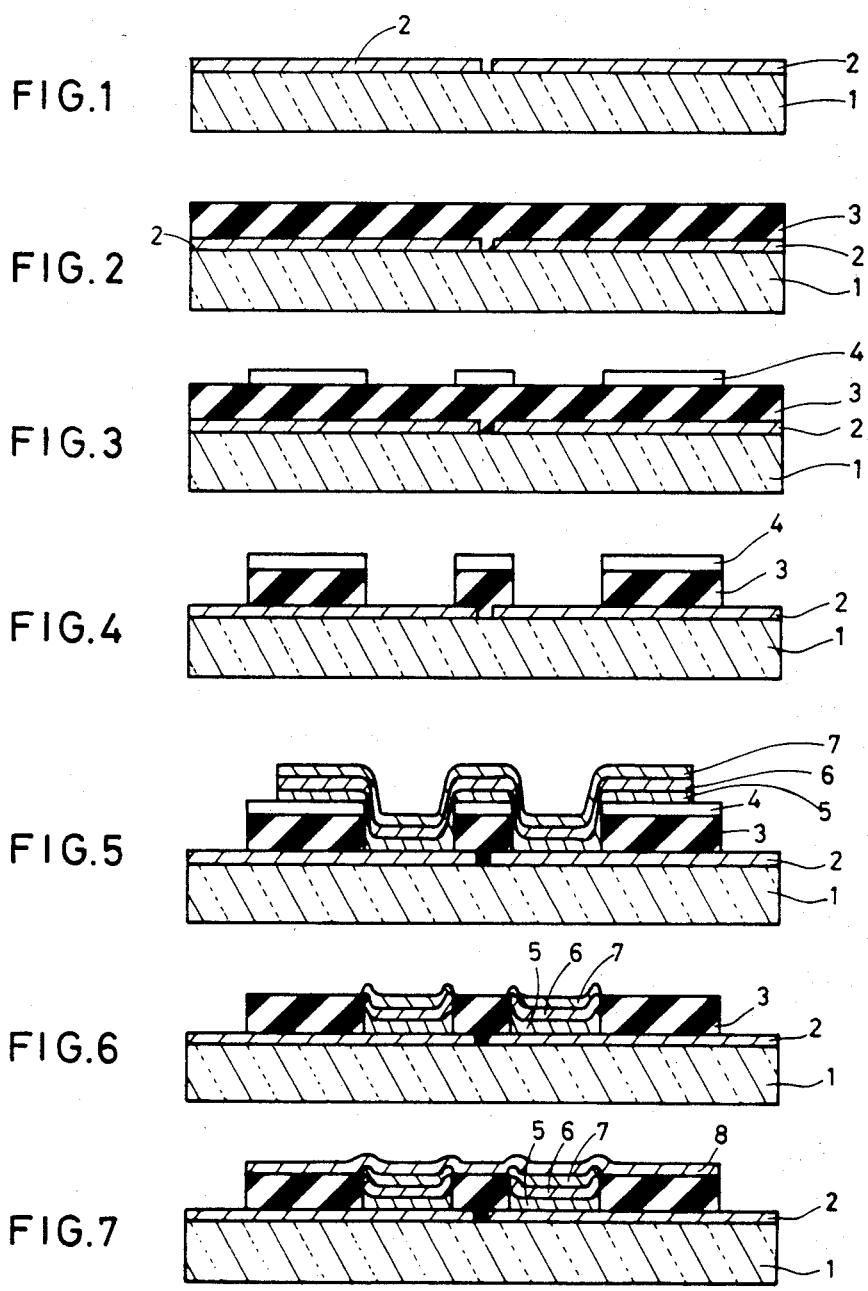

METHOD FOR MANUFACTURING AN ELECTROCHROMIC DISPLAY DEVICE

BACKGROUND OF THE INVENTION

The present invention relates to an electrochromic display device (referred to as ECD hereinafter) and more particularly, to ECD of the type in which at least two discrete electrochromic materials (one of which is referred to as "EC material" hereinafter) are layered so that the two EC materials provide a visual display in combination.

The present invention is concerned with ECD of the type which comprises a first EC material layer, a second EC material layer, and a solid electrolyte layer interposed between the first and the second EC material layers. Either of the first and the second EC material layers can function as a display electrode and a counter electrode. Preferably, the first EC material layer is made of a material for coloring upon oxidation (referred to as an "oxidation-coloring material") and the second EC material layer is made of another material for coloring upon reduction (referred to a "reduction-coloring type").

Upon the application of a current having a single direction, the first and the second EC material layers are colored simultaneously. No background layer is interposed between them, so that the color by the first EC material layer is mixed with that by the second EL material layer. The display contrast can be improved by this mixture of the colors. When the reverse current is applied to the first and the second EL material layers, they are decolored simultaneously.

According to the conventional manufacture method for the above type of ECD, each of the first and the second EL material layers, the solid electrolyte layer and an insulating layer must be patterned using a mask evaporation or etching process in discrete steps, which was very complicated.

Very minute exact pattern alignment is required between the four layers. If one layer of the first and the second EC material layers, and the solid electrolyte layer is misaligned with respect to the other, the response time of the deviated portion of the layer is very slow, to thereby damage the display visibility. Since the insulating layer is provided for preventing the leakage between the EC material layers, the insulating layer must be deposited to completely cover portions free of the EC material layers, and the solid electrolyte layer.

SUMMARY OF THE INVENTION

Accordingly, it is an object of the present invention to provide an improved method for manufacturing ECD comprising first and second EC materials, a solid electrolyte layer interposed between the EL materials, and an insulating layer.

It is another object of the present invention to provide an improved ECD comprising first and second EC materials, a solid electrolyte layer interposed between the EC materials, and an insulating layer, all the layers being accurately aligned.

It is a further object of the present invention to provide an improved method for manufacturing an ECD comprising first and second EC materials, a solid electrolyte layer interposed between the EC materials, and an insulating layer, using a single masking element.

Briefly described, in accordance with the present invention, a method for preparing an electrochromic display device comprising first and second electrochromic layers and a solid electrolyte interposed therebetween, comprises the steps of forming a conductive film on a substrate, forming an insulating film, over the entire surface of the conductive film, forming a resist at portions on the insulating film other than a display pattern and lead-in electrodes, removing the insulating film at the display pattern and the lead-in electrodes, forming the electrochromic material layers and the solid electrolyte over the entire portions of said display other than the lead-in electrode, removing the resist and the electrochromic layers and the solid electrolyte as formed on the insulating film, and forming a second electrode on the second electrochromic layer.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 1 through 7 show a cross-sectional view of layers to form the ECD of the present invention.

DESCRIPTION OF THE INVENTION

The ECD of the present invention is outlined as follows:

The ECD comprises a first EC material layer, a second EC material layer, a solid electrolyte layer interposed between the first and the second EC material layers, and an insulating layer provided to dispose the other portions except the first and the second EC material layers and the solid electrolyte layer.

Either of the first and the second EC material layers can function as a display electrode and a counter electrode. Preferably, the first EC material layer is made of an oxidation-coloring material, and the second EC material layer is made of a reduction-coloring material.

An all solid type of an EC material is referred to as the type which employs a solid electrolyte for supplying ions used for the electrochromic reaction. A solid/liquid electrolyte type of an EC material is referred to as the type which employes a liquid electrolyte for supplying ions used for the electrochromic reaction.

The solid electrolyte layer serves to supply ions used for the electrochromic reaction. The solid electrolyte layer can be replaced by a dielectric thin film. The term "solid electrolyte layer" as used herein contains the solid electrolyte layer itself and the dielectric thin film.

The conventional EC materials can be classified into a mono-color type (transparency-coloration) and a multi-color type. The mono-color type is further classified into one type for coloring upon reduction and the other type for coloring upon oxidation. Specific examples are as follows:

$WO_3$: an inorganic element, an all solid type or a solid/liquid electrolyte type, the mono-color type, and the reduction-coloring material $IrO_2$: an inorganic element, an all solid type or a solid/liquid electrolyte type, the mono-color type, and the oxidation-coloring material viologen: an organic element, the mono-color type, the reduction-coloring material, and a precipitation type for precipitating an insuluble colored film on a cathode by reducing a colorless liquid through electrochemical reaction In an aspect of a display scheme, ECDs are further classified into positive display types and a negative display types. Otherwise, ECDs are classified into transparent display cell types and reflective display cell types. In the reflective display cell type, a metal reflective electrode is provided and, otherwise, a transparent electrode is provided together with a background layer disposed in the inner side of the cell.

The gist of the manufacturing process of the present invention is as follows:

The insulating layer is deposited over the entire surface of a first electrode disposed on a substrate. A resist layer is disposed on portions of the first electrode on which the insulating layer should remain. The insulating layer as disposed on the portions free of the resist layer removed by the etching process.

According to the present invention, the resist layer is used as a lift-off resist layer to pattern coloring layers containing the first and the second EC materials and the solid electrolyte layer. After the coloring layers are layered on the remaining layer, the resist layer is removed so as to remove the coloring layers on the resist layer.

According to the above process, the edges of the coloring layers are contacted with the edge of the insulating layer, accurately. No overlap or separation between the edges of the coloring layers and the edge of the insulating layer is present.

The first and the second EC material layers and the solid electrolyte layer used to form the coloring layers are deposited and patterned in turn using the same resist layer. The edges of the first and the second EC material layers and the insulating layer are accurately lined.

In the following description, the insulating layer is deposited prior to the coloring layers. The coloring layers can be deposited prior to the insulating layer.

Now referring to FIGS. 1 through 7, the manufacture process of the present invention will be described.

Process (A) referred to FIG. 1:

Over a side of a substrate 1, a conductive film is deposited so that the conductive film is patterned to prepare a first electrode 2. The substrate 1 may be made of glass, ceramic, or the like. A polymer may be utilized for the substrate 1. The material of the conductive film may be an ITO film containing $In_2O_3$ as the principal constituent, or an NESA film containing $SnO_2$ as the principal constituent.

The ITO film is patterned with the wet etching process. The NESA film is patterned with the lift-off process.

Process (B) referred to FIG. 2:

An insulating layer 3 is disposed on the entire surface of the first electrode 2 and the substrate 1. The insulating layer 3 may be made of $SiO_2$ or $Si_3N_4$. The insulating layer 3 is deposited using Chemical Vapor Desposition (CVD), spattering, ion plating, or thermal decomposition.

Process (C) referred to FIG. 3:

Over a lead-in electrode portion and the like on which the insulating layer 3 should remain, a resist 4 is deposited with screen printing or the like. The resist 4 is segmented and patterned. Preferably, the resist 4 may be an inorganic resist.

The inorganic resist as called herein and used in Process (C) is featured in that the principal constituent hereof is a filler such as inorganic material powder, carbon metal powder or the like, and any solvents or resin materials are added to form a paste so that when the resist is baked, the resist is not carbonized so as to remain the filler only, when heated above about 300° C. The resist can be removed with water, dilute acid or the like. A preferred example of the inorganic resist contains $BaCO_3$ and $CaCO_3$ as the principal constituents, which is, a preferred example of the inorganic resist known as MSN-42B (Minetch Corporation, U.S.A.) or varniphite S-3 (Nippon Graphite, Japan).

The resist 4 is pre-baked at about 150° C. for about 1 hour. It is baked at about 350° C. for about 1.5 hours in a muffle furnace. The reason why the resist 4 is forced to gas with the heat of about 350° C. is to eliminate the influence of the gas at Process (E) in which EC material layers are to be deposited.

In contrast to the inorganic resist, an organic resist is not suitable for this resist because the organic resist contains a resin materials the principal constituent and it has poor thermal resistivity. When baked, it is easily carbonized to prevent the resist from being removed. Further, the organic resist emits gas when the EC materials are to be deposited, to thereby damage the property of the ECD cell.

Process (D) referred to FIG. 4:

The insulating layer 3 is removed which is not covered by the resist 4. On the remaining insulating layer 3, an EC material layer is to be deposited and the lead-in electrode portion is to be provided. The insulating layer 3 is removed with the dry etching method. The first electrode 2 is exposed. As an etching gas, $CF_4$ is utilized, so that only the insulating layer 3 made of $SiO_2$ is etched and the first electrode 2 is not damaged.

Process (E) referred to FIG. 5:

The lead-in electrode is masked so that a first lead-in electrode is masked so that a first EC material layer 5, a solid electrolyte layer 6, and a second EC material layer 7 are deposited subsequently.

One of the first and the second EC material layers 5 and 7 may be made of $WO_3$ or $MoO_3$ which is the reduction-coloring material. The other of them may be made of NiO or $IrO_2$ which is the oxidation-coloring material. The first and the second EC material layers 5 and 7 are deposited with vacuum evaporation, sputtering, ion plating or the like.

The solid electrolyte layer 6 is composed of a pure solid electrolyte such as $Li_3N$ or the like, and, otherwise, a porous evaporated film as a dielectric thin-film made of $SiO_2$, $CaF_2$, $MgF_2$ or the like. The porous evaporated film serves to supply $H^+$ and $OH^-$ by dissolving moisture absorved by the porous evaporated film. The ions are necessary for causing the electrochromism.

The layers 5 to 7 are segmented and patterned with the help of the patterned resin 4.

Process (F) referred to FIG. 6;

The resist 4 is removed with dilute hydrochloric acid to thereby pattern the first EC material layer 5, the solid electrolyte layer 6 and the second EC material layer 7.

Process (G) referred to FIG. 7:

A second electrode 8 is layered in contact with the second EC material layer 7, to thereby complete the ECD cell. It may be possible that a resin coating can be provided over the second electrode 8 for protecting or a protecting plate can be attached to the second electrode 8. The first and the second EC material layers 5 and 7, and the solid electrolyte layer 6 are all patterned and segmented, so that each combination of the layers 5 to 7 is isolated from the other combination of the layers 5 to 7 by the insulating layer 3. Therefore, it is unnecessary to pattern the second electrode 8.

Each solid electrolyte layer 6 is isolated from the other solid electrolyte layer 6 by the insulating layer 3.

If a common solid electrolyte layer is provided between the EC material layers 5 and 7, and the neighbor EC material layers 5 and 7, a current due to an electromotive force based on the variations in the coloration depth between the EC material layers 5(or 7) and neighbor EC material layer 5 (or 7) can flow through the common solid electrolyte layer. This may lead to the fault that the layer 5(or 7) to be decolored may be colored.

According to the present invention, the solid electrolyte 6 is isolated from the other solid electrolytes 6 and the display segments is isolated by the insulating layer 3, so that the blotting coloration of the EC layer 5(or 7) is prevented because such current flow is stopped.

A transparent type ECD is presented when all of the substrate 1, the first electrode 2 and the second electrode 8 are transparent. A specific display pattern can be observed from the both side of the ECD. A reflective type ECD is presented when a white or a pale-colored non-transparent substrate 1 is used, or either of the electrodes 2 and 8 is made of a metal. Such non-transparent substrate 1 can be obtained by mixing a dye material into the glass or the ceramic substrate 1.

When the display pattern is not segmented, the substrate 1 and the first electrode 2 can be replaced by a metal plate. In the reflective type ECD, the display portion and the background portion are adjacent to thereby provide good visibility. In the above process, the insulating layer 3 is the first disposed and patterned with the dry etching. On the contrary, it may be possible that the first EC material layer 5, the solid electrolyte layer 6, and the second EC material layer 7 are first deposited and patterned with the dry etching, and, then, the insulating layer 3 is deposited. The unnecessary portions of the insulating layer 3 can be removed with the lift-off method.

In such a case, the resist layer is layered on the patterned second EC material layer.

As described above, the first EC material layer 5, the solid electrolyte layer 6, the second EC material layer 7, and the insulating layer can be patterned with the single resist layer 4. The edges of these layers are accurately aligned. Preferred examples of the thickness of the layers are as follows:

The substrate: about 1 mm or so, each of the first electrode 2 and the second electrode 8: about 500–about 2000Å, the insulating layer 3: about 1000Å–about 1 μm, each of the first EC material layer 5 and the second EC material layer 7: about 1000Å–about 1 μm, the solid electrolyte layer 6: about 500Å–about 5000Å

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for preparing an electrochromic display device comprising first and second electrochromic layers, and a solid electrolyte interposed therebetween, comprising the steps of:
   forming a conductive film at desired areas on a substrate;
   forming an insulating film over substantially the entire surface of said substrate;
   forming a resist layer over substantially the entirety of the insulating film other than the desired locations of a display pattern and at least one lead-in electrode;
   removing the insulating film at said desired locations;
   forming the first and the second electrochromic layers and the solid electrolyte interposed therebetween over portions of said substrate other than said at least one lead-in electrode;
   removing the resist layer and the entirety of the first and the second electrochromic layers and the solid electrolyte layer formed thereon; and
   forming at least one electrode on the second electrochromic layer.

2. The method of claim 1 wherein one of the first and the second electrochromic layers is composed of an oxidation-coloring electrochromic material and the other of them is composed of a reduction-coloring electrochromic material.

3. The method of claim 1 wherein said step of forming the first and second electrochromic layers and the solid electrolyte forms said layers and electrolyte over substantially the entire surface of said substrate;
   said step of removing said resist layer forming a pattern of remaining first and second electrochromic layers and the solid electrolyte while exposing the insulating film in those areas where said resist layer is removed.

4. The method of claim 3, wherein one of the first and the second electrochromic layers is composed of an oxidation-coloring electrochromic material and the other of them is composed of a reduction-coloring electrochromic material.

5. The method of claim 3 wherein said first and second electrochromic layers and said solid electrolyte remain after said step of removing said resist layer in said areas where said insulating film is removed during said step of removing said insulating film.

6. A method for preparing an electrochromic display device comprising first and second electrochromic layers, and a porous evaporated film interposed therebetween, comprising the steps of:
   forming a conductive film at desired electrode areas on a substrate;
   forming an insulating film over substantially the entire surface of said substrate;
   forming a resist layer over substantially the entirety of the insulating film other than the desired locations of the display pattern and at least one lead-in electrode;
   removing the insulating film at said desired locations;
   forming the first and the second electrochromic layers and the porous evaporated film interposed therebetween over portions of said substrate other than said at least one lead-in electrode;
   removing the resist layer and the entirety of the first and the second electrochromic layers and the solid electrolyte layer formed thereon; and
   forming at least one second electrode on the second electrochromic layer.

7. The method of claim 6 wherein the steps of forming the first and second electrochromic layers and the porous evaporated film forms said layers and film over substantially the entire surface of said substrate;
   said step of removing said resist layer forming a pattern of remaining first and second electrochromic layers and the porous evaporated film while exposing the insulating film in those areas where said resist layer is removed.

8. The method of claim 7 wherein said first and second electrochromic layers and said solid porous evaporated film remain after said step of removing said resist layer in said areas where said insulating film is removed during said step of removing said insulating film.

9. A method for preparing an electrochromic display device comprising first and second electrochromic layers, and a solid electrolyte interposed therebetween, comprising the steps of:

forming a conductive film at desired areas on a substrate;

forming the first and second electrochromic layers and the solid electrolyte interposed therebetween over said substrate;

etching said first and second electrochromic layers and said solid electrolyte to form desired patterns;

depositing an insulating film over said substrate;

removing said insulating film from said desired patterns; and forming at least one second electrode on the second electrochromic layer.

10. The method of claim 9 wherein said step of etching comprises;

forming a resist layer on portions of said first and second electrochromic layers and said solid electrolyte conforming to desired patterns; and removing said first and second electrochromic layers and said solid electrolyte in those areas not having a resist layer formed thereon;

said resist layer being removed during said step of removing said insulating film.

11. A method for preparing an electrochromic display device comprising first and second electrochromic layers, and a porous evaporated film interposed therebetween, comprising the steps of:

forming a conductive film on a desired substrate;

forming the first and the second electrochromic layers and said porous evaporated film interposed therebetween;

etching said first and second electrochromic layers and said porous evaporated film to form desired patterns;

depositing an insulating film over said substrate;

removing said insulating film from said desired patterns; and forming at least one second electrode on the second electrochromic layer.

12. The method of claim 11 wherein said step of etching comprises;

forming a resist layer on portions of said first and second electrochromic layers and said porous evaporated film conforming to desired patterns; and removing said first and second electrochromic layers and said porous evaporated film in those areas not having a resist layer formed thereon;

said resist layer being removed during said step of removing said insulating film.

* * * * *